United States Patent [19]

Sourgens et al.

[11] 4,007,341
[45] Feb. 8, 1977

[54] ECHO CANCELLING DEVICE

[75] Inventors: Jacques Sourgens, Massy; Dominique Lajotte, Ris Orangis; Francois Michelon, Bretigny-sur-Orge, all of France

[73] Assignee: Compagnie Industrielle des Telecommunications Cit-Alcatel, Paris, France

[22] Filed: May 12, 1975

[21] Appl. No.: 576,423

[30] Foreign Application Priority Data

May 24, 1974 France .................. 74.18115

[52] U.S. Cl. ............................. 179/170.2
[51] Int. Cl.² ............................. H04B 3/20
[58] Field of Search ......... 179/170.2, 170.6, 170.8

[56] References Cited

UNITED STATES PATENTS

| | | | |
|---|---|---|---|
| 3,732,410 | 5/1973 | Mackechnie | 179/170.2 |
| 3,735,055 | 5/1973 | Thomas | 179/170.2 |
| 3,821,493 | 6/1974 | Chiba | 179/170.2 |
| 3,836,734 | 9/1974 | Campanella et al. | 179/170.2 |
| 3,894,200 | 7/1975 | Campanella et al. | 179/170.2 |
| 3,922,505 | 11/1975 | Höge | 179/170.2 |

*Primary Examiner*—Kathleen H. Claffy
*Assistant Examiner*—Randall P. Myers

[57] ABSTRACT

Echo canceller, canceling an echo signal $y(t)$, generated by a signal $x(t)$, comprising a transversal digital filter whose N weighting coefficients $C_i$, correlated with N coded samples of $x(t)$ enable the forming of a synthetic echo signal $\hat{y}(t)$ and comprising an adaptive control loop adjusting the coefficients $C_i$, characterized in that the adaptive control loops effects the correlation between the signs of the N coded samples of $x(t)$ and of the residual echo signal $\gamma(t)$ and determines the correction $\Delta C_i$ adjusting the coefficients $C_i$ by multiplication of the residual signal $|\epsilon(t)|$ by a coefficient $\alpha$ close to zero accompanied by the sign of the aforementioned correlation of signs.

5 Claims, 4 Drawing Figures

ECHO CANCELLING DEVICE

The present invention relates to a device for cancelling echoes in a voice frequency signal transmission circuit, in a two-way telephone network.

It is known that in telephonic lines having circuits with two and four wires, connected together in a differential transformer, echo signals appear in the emission line. The echo canceller connected up in the four-wire circuit on the differential transformer side aims at reducing the echo signal appearing on the emission line without deteriorating the quality of the transmission.

The operation of the echo canceller is based on the fact that the path of the echo signal can be considered as a filter and that this echo signal $y(t)$ is obtained by the convolution of the pulse reply $h(t)$ of the path and of the signal $x(t)$ emitted by a distant subscriber.

According to the known technique, such an echo canceller of the digital type is constituted essentially by a transversel filter having controlled weighting coefficients.

The transversal filter makes it possible to form a synthetic echo $\hat{y}(t)$ from a finite number, for example $N$, of filtration coefficients $C$, representing the samples of the pulse reply of the echo path $h(t)$ and a same number of samples $X(t)$ of the received signal $x(t)$, sampled successively and suitably delayed. That echo signal $\hat{y}(t)$ obtained synthetically is subtracted from the true echo signal $y(t)$ existing in the emission line.

An adaptive control loop makes it possible to adjust the filtration weighting coefficients $C$ so as to obtain a residual echo $\epsilon(t) = y(t) - \hat{y}(t)$ which is as small as possible.

In that adaptive loop, it is the result of the correlation between $\epsilon(t)$ and $X(t)$ which adjusts the values of the coefficients $C$ so that these latter represent as exactly as possible the samples of the echo path pulse reply, $h(t)$.

A known embodiment of the echo canceller of the digital type is shown in FIG. 1. The echo canceller is installed near differential transformer 10 connecting a two-way two-wire circuit 11 to a four-wire circuit formed by two one-way channels (receiving and emitting) 12 and 13. The four-wire circuit connects the two-wire circuit 11 to another two-wire circuit, not shown, through another differential transformer, not shown, to constitute a telephone circuit between two subscriber sets connected up on the two-wire circuits.

A first shift register 20 records the samples $X(t)$ sampled successively on the line 12 at intervals $T$ and put in digital form in an analog-to-digital convertor 21. The capacity of register 20 is $N$. At each new sampling interval $T$, the oldest sample $X(t)$ is replaced by the arrival of a new sample on the input. That register 20 has $N$ outputs 22 from which the samples which exist there, referenced $X(t), X(t-T), \ldots X(t-NT)$ for the sampling period $T$, are taken.

A second shift register 24 memorizes $N$ filtration weighting coefficients referenced $C_1 \ldots C_N$. During each sampling period $T$, the contents of the two registers 20 and 24 are multiplied two by two in a multiplier 25 and the sum of these products is calculated in a summing circuit 26.

The summing circuit 26 provides the synthetic echo signal $\hat{y}(t)$ which is at the instant $t$ considered:

$$\hat{y}(t) = \sum_{i=1}^{N} C_i X(t-iT) = C_1 X(t) + \ldots + C_N X(t-NT)$$

It is this synthetic echo signal $\hat{y}(t)$ which is deducted from the true echo $y(t)$ so as to transmit only a residue of echo: $y(t) - \hat{y}(t)$.

In order to improve the quality of the transmission as much as possible by reducing that residual echo, the device for cancelling echoes controls the values of the weighting coefficients $C_i$ existing in the register 24, as a function of the residual echo signal.

That residual echo signal is formed in a digital subtractor 27 receiving the signal formed $\hat{y}(t)$ and the echo signal sampled at the instant $t$ and put in digital form in an analog-to-digital convertor 23. The residual echo signal, in digital form, $\epsilon(t)$, at the output of the subtractor 27 is applied to a multiplier 28 also receiving the samples $X(t)$ existing in the register 20. During the period $T$, the error sample $\epsilon(t)$ is multiplied successively, in the circuit 28, by the $N$ samples $X(t-iT)$ of the register 20. It is the result of the correlation between $\epsilon(t)$ and $X(t)$ which adjusts the values of the weighting coefficients $C_i$ so as to make error signal $\epsilon(t)$ as weak as possible in as short a time as possible.

The result of each of the multiplications effected in the multiplier 28 provides a correction term $\Delta C_i$ which is supplied to the summing device 29 at the same time as the coefficient $C_i$ of same order coming from the register 24. That summing device 29 corrects the coefficients $C_i$ in the memory in the register 24 and applies the coefficients $C_i$, corrected by the $\Delta C_i$ of same order, to the aforementioned multiplier 25.

At the output of the subtractor 27, a digital-to-analog converter 30 transmits the residual echo signal $\epsilon(t)$ which substitutes itself for the echo $y(t)$ on the line 13 accompanied, if need be, by a signal $z(t)$ emitted by a near subscriber.

In the above device, it is the result of the correlation between $\epsilon(t)$ and the samples $X(t)$ of the received signal $x(t)$ which adjusts the weighting coefficients $C_i$ to make the error signal $\epsilon(t)$ as weak as possible, in as short as possible a time called the convergence period. According to the value of $\epsilon(t)$ in relation to a given threshold, the correction term applied to the coefficients $C_i$ can assume a definite value among a few possible definite values.

The present invention has as its object an echo canceller of digital type, based on the above principle, produced in a simple way and implementing a particular method of processing the signals $\epsilon(t)$ and $X(t)$ making it possible to increase the performances of the device.

The present invention has as its object an echo canceller comprising a transversal filter, to form a synthetic echo signal $\hat{y}(t)$, effecting a convolution of $N$ samples $X(t)$ each coded on $n$ bits of a received signal $x(t)$, recorded in a first memory and of $N$ filtration weighting samples $C$ obtained by correlation of the residual echo signal $\epsilon(t)$ and of the samples $X(t)$ and recorded in a second memory, a digital subtractor forming the residual echo signal coded on $n$ bits based on the true echo signal $y(t)$ and on the synthetic echo signal, $\hat{y}(t)$ and an adaptive control loop for adjusting the filtration weighting coefficients $C$ from the value of the said residual echo signal and from the correlation of the signs of $N$ samples $X(t)$ of the received signal and of the residual echo signal determining the sign of each of the variations of the filtration weighting coefficients C, characterized in that the said filtration weighting coefficients C, lower than $2^n$, are recorded in the said second memory (24) each on $n + m$ bits and that the said adaptive control loop is constituted by a first adder (38) having $(n + m)$ first inputs receiving the successive filtration weighting coefficients and having $(n + m)$ second inputs receiving the residual echo signal $\epsilon(t)$ multiplied by a coefficient $\alpha$ close to zero and accompanied by the sign of the correlation of the signs effected, $m$ being the minimum number of bits necessary for representing the reverse of the coefficient $\alpha$, and sending out the filtration weighting coefficients to the said second memory on which it is looped.

Such an echo canceller in which the coefficients C, coded on $n + m$ bits, the $m$ bits representing a decimal part, are corrected by increments or decrements obtained by multiplication of $|\epsilon(t)|$ by $\alpha$ close to zero gives more particularly:
a precise calculation of each new coefficient C;
A precise knowledge of the slight error on each new coefficient C thus calculated.

Other characteristics and the advantages of the present invention will become apparent from the description given with reference to the accompanying drawing, in which.

Figure 1:
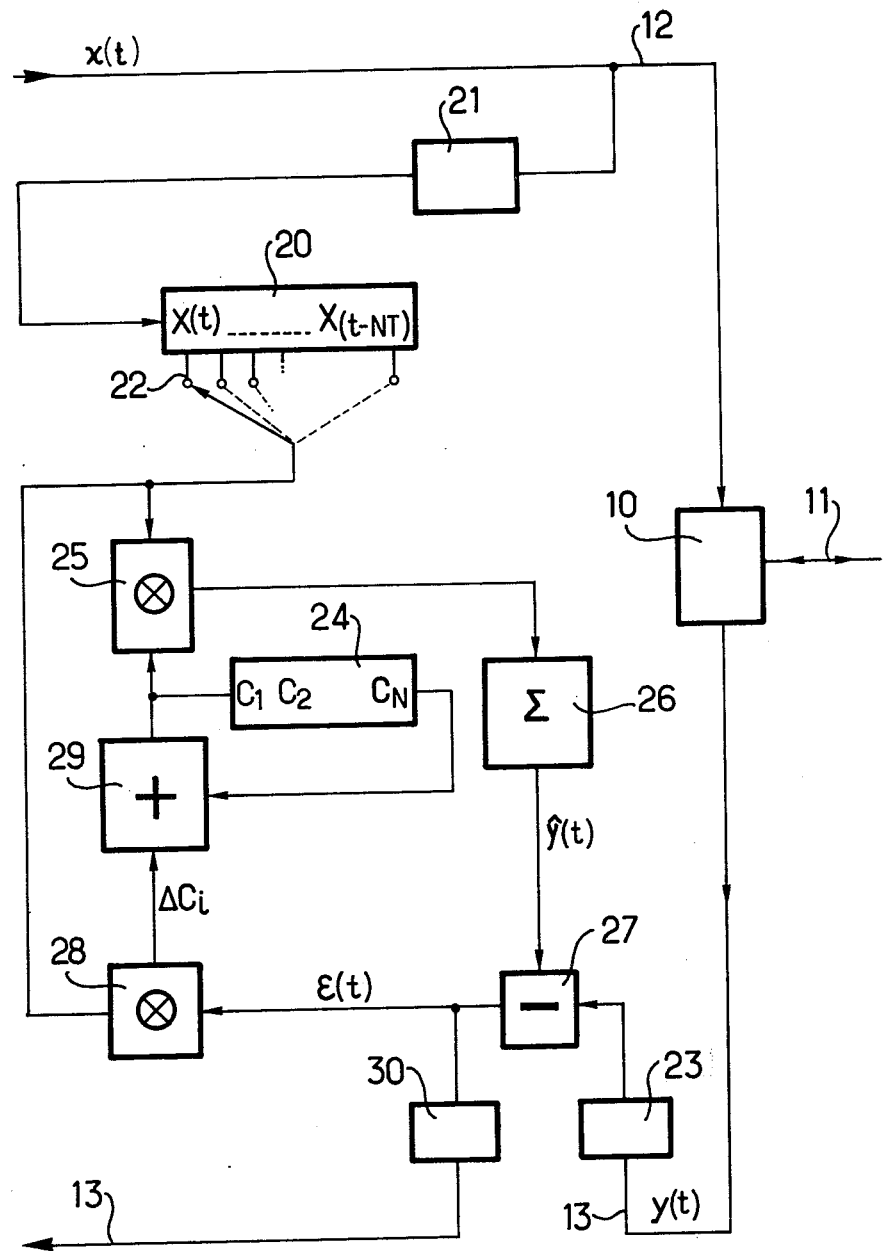
FIG. 1 is a diagram of an echo canceller according to the prior art.

The diagram of the echo canceller according to FIG. 1 has been described hereinabove.

Figure 2:
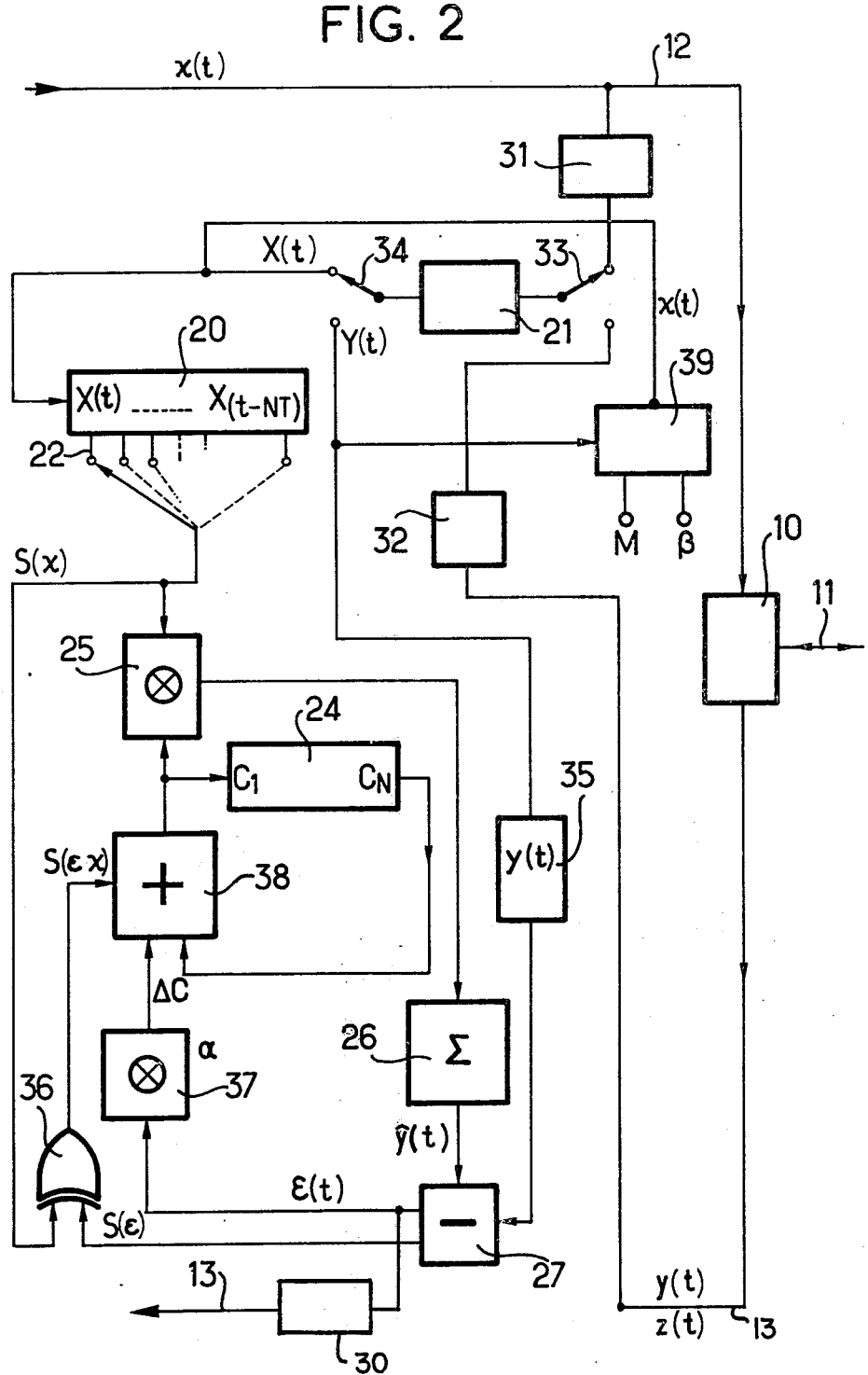
FIG. 2 is a diagram of an echo canceller according to the invention.

FIG. 2 shows a diagrammatic form of an embodiment of the echo canceller according to the invention. In FIG. 2, the elements which are identical to those in FIG. 1 are designated by the same references.

In FIG. 2, a single analog-to-digital convertor, namely the convertor designated by 21, ensures the coding in $n$ bits, of the samples of the receiving signal $x(t)$ and of the echo signal $y(t)$ after sampling at 31 and 32 of those signals. A first commutating circuit 33 directs these sampled signals on the coder 21, whereas a second commutating circuit 34 directs the coded signals $X(t)$ and $Y(t)$ respectively towards the memory 20 constituted by a shift register having a capacity of N coded samples $X(t)$ and towards a memory 35 receiving the coded samples $Y(t)$.

The forming of the synthetic echo signal, designated by $\hat{y}(t)$ for the sampling period T of the receiving signal $x(t)$, is obtained by successive multiplications at 25, of the N samples $X(t)$ and of the coefficients $C_i$ of corresponding order and summing, at 26, of the N products $C_i X(t)$. The residual echo signal $\epsilon(t)$ is formed in the digital subtractor 27 in comparison with the synthetic echo signal $\hat{y}(t)$ and of the true echo signal $y(t)$.

The adaptive correction loop for the filtration weighting coefficients $C_1$ to $C_N$, recorded in the shift register 24, operates by correlation between $\epsilon(t)$ and the N samples of the receiving signal $X(t)$ in the memory at 20. That adaptive loop comprises a multiplier 36 for the signs S of the samples $X(t)$ taken successively and for the residual echo signal $\epsilon(t)$ supplying N signals S ($\epsilon X$) to give the sign of each correction to be made to each of the weighting coefficients $C_i$. The multiplying circuit 36 is then constituted by a simple logic exclusive OR gate.

The adaptive loop comprises, moreover, an adder 38 looped back on the memory 24 containing the coefficients $C_i$. The adder 38 receives on the one hand the successive coefficients $C_i$ and on the other hand the residual echo signal $|\epsilon(t)|$ across a multiplier 37, accompanied by the successive sign bits of the correlation S ($\epsilon X$). The multiplier 37 effects the multiplication of $|\epsilon(t)|$ by a coefficient $\alpha$ close to but greater than zero, chosen, to great advantage, hereinafter, as equal to 1/256. The adder circuit 38 sends out a correction term $|\Delta C_i|$, equal to $\alpha |\epsilon(t)|$ of the coefficients $C_i$; it forms, with the memory 24, a digital integrator having a very low gain in the control loop, having the configuration of a low-pass filter of the first order having a very low cut-out frequency. In the adaptive loop, the correction of the weighting coefficients $C_i$ is in connection with the $\epsilon(t)$ dynamic characteristic, the direction of the correction is given by correlation of the signs of the samples $X(t)$ and of the residual echo $\epsilon(t)$. The proper operation of that adaptive loop is connected to the fact that, with a view to enabling a correction, which is the most exact possible, of the N weighting coefficients $C_i$ by the correction term $\Delta C_i$, the coefficients $C_i$ are recorded in the memory 24 in the form of words each having $n + m$ bits. The $n$ bits define positive whole numbers; the $m$ bits define positive values lower than 1, the number $m$ corresponds to the number of bits necessary for the binary representing of $\alpha$. Where $\alpha = 1/256$, that is, $2^{-8}$, the number $m$ is equal to 8. The adder 38 will then have $n + m$ inputs for receiving the $n + m$ bits of the coefficients $C_i$ and $m$ inputs for receiving the increase $|\Delta C_i = \alpha \cdot |\epsilon(t)||$.

That arrangement makes it possible to bring in a slight error on each new coefficient $C_i$; moreover that error is known with precision.

FIG. 2 shows, moreover, a threshold detector circuit 39 incorporated in the device. That detector 39 receives the signal existing on the emission line 13 sent out at the output of the coder 21 and of the commutating circuit 34. The detector 39 is conditioned by the receiving signal $X(t)$ coming from the far end and sent out by the commutating circuit 34. It effects comparison of the signal in the line 13 with a reference level calculated taking into account the signal $X(t)$, or chosen equal to a maximum possible level of the echo signal on the line 13. That threshold detector circuit 39 sends out a first signal $\beta = 1$ for a level of the signal on the line 13 which is lower than that reference. It sends out a second signal $M = 1$ at the time of exceeding of the reference level. When the signal $x(t)$ is absent, these two signals $\beta$ and M are: $\beta = 0$ and $M = 0$. The signal $\beta = 1$, where M is necessarily 0, is significant of the presence on the line 13 only of an echo signal $y(t)$ generated from $x(t)$. The signal $M = 1$, where $\beta$ is necessarily 0 is significant of the presence on the line 13 of an echo signal $y(t)$ on which a transmission signal $z(t)$ coming from the near end 11 is superimposed: this is the case of the operation of the transmission circuit in the double speech conversation mode.

The advantage of this detector 39 will be seen hereinbelow more particularly with reference to FIG. 4.

Figure 3:
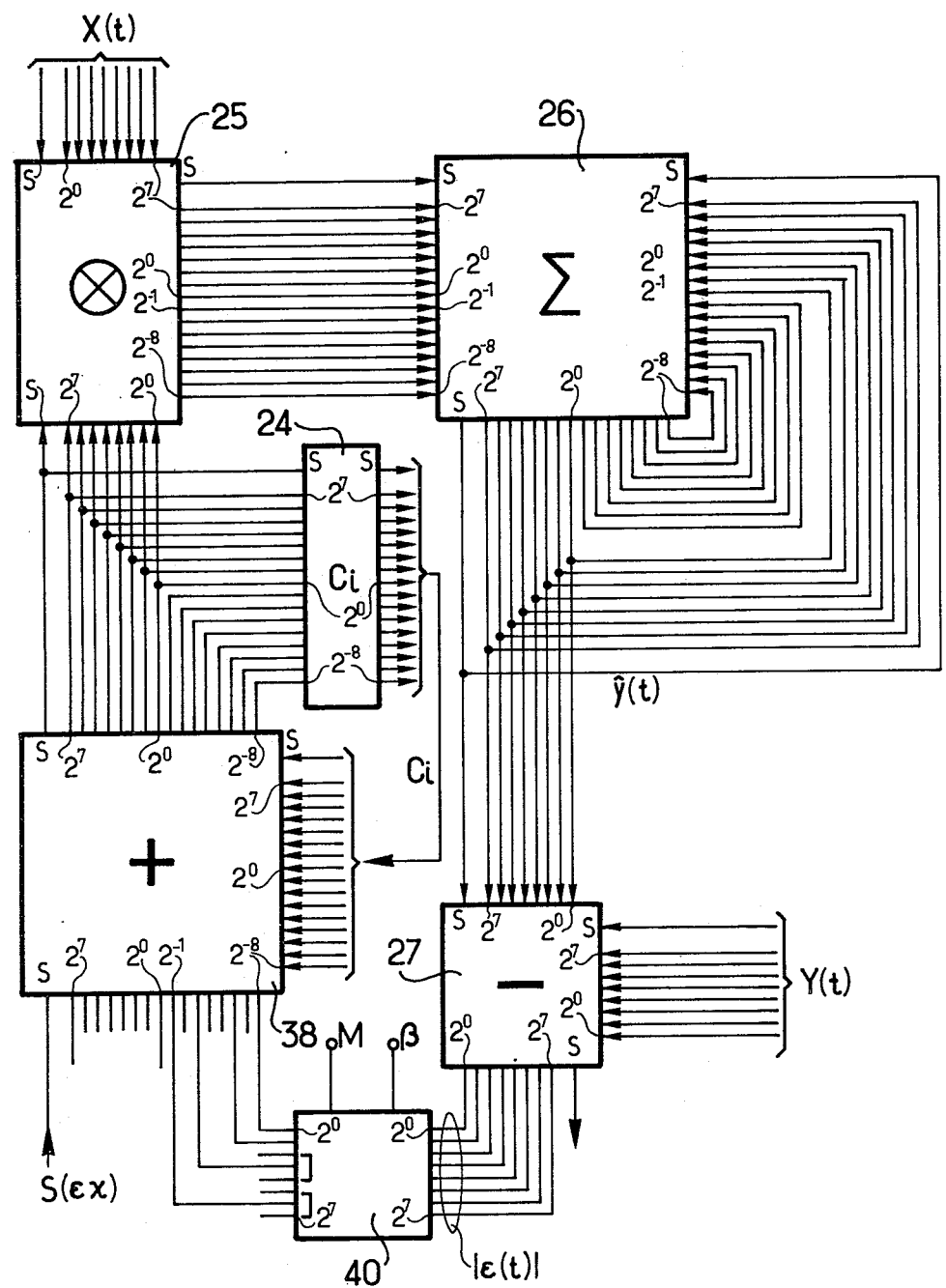
FIG. 3 shows an embodiment of the diagram according to FIG. 2.

FIG. 3 illustrates a particular embodiment of the device according to FIG. 2 in the case where the samples $X(t)$ and $Y(t)$ are coded with $n = 8$ bits accompanied by a bit S and in the case where the coefficient $\alpha$ of multiplication of $\epsilon(t)$ is chosen as equal to 1/256, where $m = 8$.

In FIG. 3, the elements in FIG. 2 are designated by the same reference numerals.

In the embodiment according to FIG. 3, the multiplier 25, multiplying the coefficients $C_i$ which reach it coded in 8 bits by the samples X (t) also coded in 8 bits, operates on 16 outputs bits referenced $2^7$ to $2^0$ and $2^{-1}$ to $2^{-8}$ respectively for the 8 output bits having a high weight and the 8 output bits having slight weight. The integrator 26 also has 16 inputs and 16 outputs to carry out the sum $$\sum_{i=1}^{N} C_i X (t-iT)$$

on 16 bits. At the end of each sampling period, the synthesised echo signal $\hat{y}$ (t) is applied to the digital subtractor 27 in the form of a signal having 8 bits, truncating that signal $\hat{y}$ (t) on the 8 bits having the slighter weight referenced $2^{-1}$ to $2^{-8}$. The residual echo signal $\epsilon(t)$ is then sent out in 8 bits accompanied by a sign bit S; these bits are referenced $2^0$ to $2^7$.

Of course, it will be understood that the signal $\hat{y}$ (t) can be sent out in the form of a signal having $n + m$ bits, that is 16 bits at the subtractor, the residual echo signal $\epsilon(t)$ will then be truncated on the $m$ bits (8 bits) having the the slightest weight; $\epsilon(t)$ is still accompanied by the formed sign bit.

The adder 38 installed in the adaptive correction loop for the filtration weighting coefficients $C_i$ comprises 16 first inputs among which only the 8 inputs having the slightest binary weight referenced $2^{-1}$ to $2^{-8}$ receive the residual echo signal $\epsilon(t)$. It also has 16 second inputs referenced $2^7$ to $2^0$ and $2^{-1}$ to $2^{-8}$ receiving the coefficients $C_i$ represented by 16 bits referenced from $2^7$ to $2^0$ and $2^{-1}$ to $2^{-8}$ which are recorded in the shift register 24. The high weights of the coefficients $C_i$ corrected in the adder 38 are used only to effect the calculating of $C_i X (t-iT)$ in the multiplier 25.

The residual echo signal $\epsilon(t)$ applied to the first inputs having a slight weight of the adder 38 represents the increase $|\Delta C_i|$ given to the coefficients $C_i$, the sign of the increase being given by the product of the signs $\epsilon(t) X (t)$. This shift by eight orders or positions ($m = 8$) of the binary weights of $\epsilon(t)$ corresponds to the multiplying of that signal by the number $n = 1/256$.

A logic circuit 40 is, to great advantage, installed between the subtractor 27 sending out the residual echo signal $\epsilon(t)$ and the adder receiving that signal, to combine the binary weights of $\epsilon(t)$ on certain of the slight binary weights of the adder. That logic circuit is conditioned by the signals M and $\beta$ coming from the detector 39 in FIG. 2.

Figure 4:
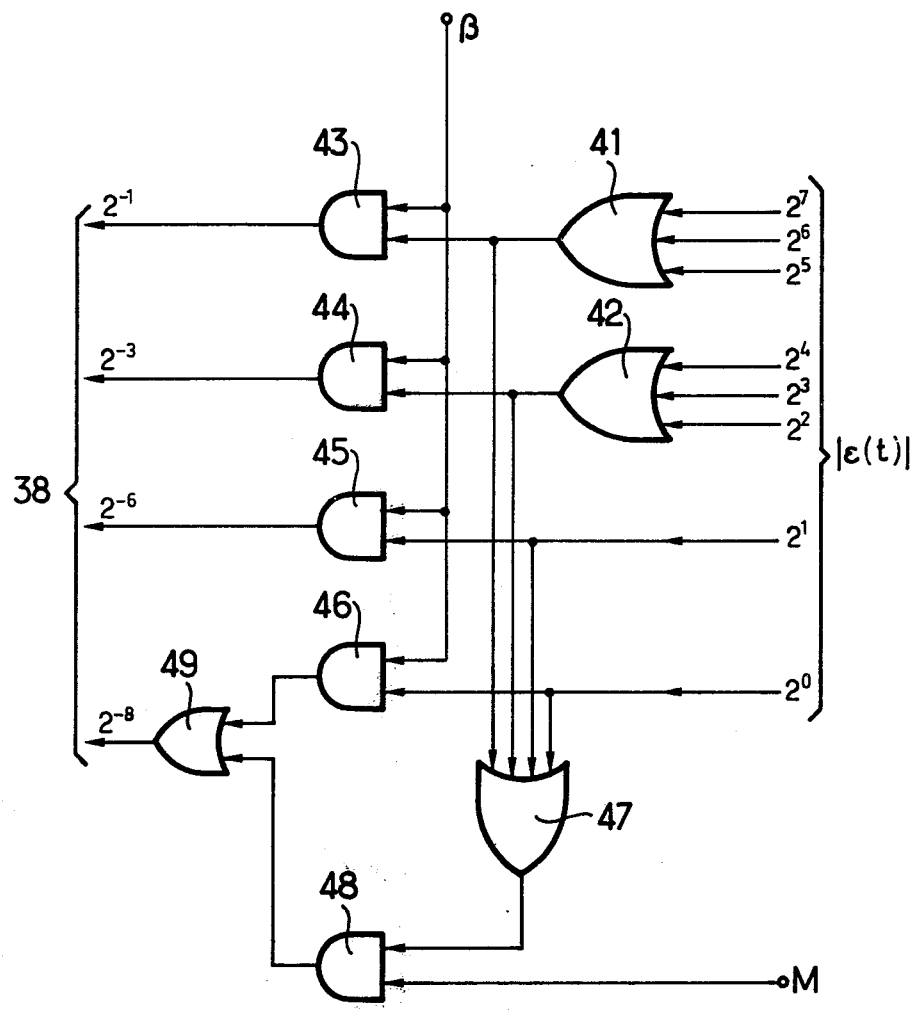
FIG. 4 is a logic circuit forming a part of the embodiment of the echo canceller according to the invention.

FIG. 4 shows a preferred embodiment of the logic circuit 40.

The residual echo signal $|\epsilon(t)|$ is applied at the input to that logic circuit. It comprises two first logic OR gates 41 and 42 combining the binary weights referenced $2^7$, $2^6$ and $2^5$, on the one hand and the weights referenced $2^4$, $2^3$ and $2^2$ on the other hand. Four logic AND gates 43, 44, 45 and 46 combine respectively the outputs of the OR gates 41 and 42 and the binary weights referenced $2^1$ and $2^0$ of $\epsilon(t)$ with the signal $\beta$ signifying the operation of the simple conversation transmission circuit $x$ (t) (coming from the detector 39 in FIG. 2). The logic circuit comprises, moreover, a third logic OR gate 47 combining together the outputs of the OR gates 41 and 42 and the binary weights $2^1$ and $2^0$ of the signal $|\epsilon(t)|$. A fifth logic AND gate 48 receives the signal coming from the OR gate 47 and the signal signifying the operation of the double conversation transmission circuit $x$ (t) and $z$ (t) (coming from the detector 39 in FIG. 2). A last logic OR gate 49 combines the signal sent out by the AND gate 48 and the signal sent out by the AND gate 48 to apply it to slightest binary weight referenced $2^{-8}$ of the summing device 38 (FIG. 3). The outputs of the AND gates 43, 44 and 45 are applied to the inputs having a slight binary weight 38 referenced respectively $2^{-1}$, $2^{-3}$ and $2^{-6}$.

This logic circuit makes it possible to give the coefficients $C_i$ increases representing the pulse reply of the echo path, whether the transmission circuit operates in the single conversation $x$ (t) or double conversation $x$ (t) and $z$ (t) mode. The signals $\beta$ and M are directly connected with the presence of the signals $x$ (t) and $z$ (t). This logic circuit gives the two following states of operation:

- when operating without an emission signal $z$ (t) coming from the near end, the signal $M = 0$ is obtained. If there is on receiving signal X (t) coming from the far end the signal $\beta$ assumes the value $\beta = 1$; the residual signal $|\epsilon (t)|$ is applied to the adder 38 across the conductive AND gates 43 to 46, the AND gate 48 remaining blocked. Consequently, the coefficient $\alpha$ is at its chosen value and the convergence of the echo canceller is fast. If there is also no signal $x$ (t), the results obtained will be $\beta=0$ and $M = 0$. All the AND gates 43 to 46 and 48 are blocked, the signal $|\epsilon(t)|$ cannot be applied to the adder 38 and no correlation between X (t) and $\epsilon(t)$ is effected.

- When the transmission circuit operates with the signal $z$ (t) and the signal $x$ (t) applied, the result obtained, due to the exceeding of the echo threshold reference level, $\beta=0$ and $M = 1$. Only the AND gate 48 is conductive and all the binary weights of $|\epsilon(t)|$ are applied to the input $2^{-8}$ of the adder 38: this corresponds to the detecting of the signal $|\epsilon(t)|$ of 16 orders towards the right and leads therefore to a slow convergence of the echo suppressor which neverthe continues to operate in the adaptive mode. If on the other hand there is no signal $x$ (t), there still being the signal $z$ (t), the result at the output of the detector is compulsorily $\beta=0$ and M = 0. The AND gates of the logic circuit 40 are all blocked: no correlation can be effected.

In the echo canceller described hereinabove, the filtration weighting coefficient number N has been chosen as $N = 64$. The sampling period T of the receiving signals $x$ (t) and echo signals $y$ (t) is $T = 125$ $\mu s$. During each period T, the bringing up to date of the values of the 64 coefficients $C_i$ is effected; simultaneously, the products $C_i X (t-iT)$ are calculated and, at the end of each period, a sample of the synthesised echo signal $\hat{y}$ (t) is formed to be compared with the sample of the true echo signal sampled, in order to provide new data for the correcting of the coefficients $C_i$.

The sample of the synthesized echo signal $\hat{y}$ (t) is formed with exactitude since its value is truncated only at the end of the sampling period and not during the summing.

It will be observed, moreover, that the exactness of the echo canceller is due, moreover, to the fact that the coefficients $C_i$ are memorized in the register 24 in the form of a 16 bit word, this making it possible to effect an exact accumulation of the correction data $\Delta C_i$, on the coefficients, whatever the value of $\Delta C_i$ may be. In the embodiment described, the data $\Delta C_i$ is given by the residual echo signal $\epsilon(t)$ to which a multiplication factor $\alpha = 1/256$ (or a shift by 8 orders of the binary weights of $\epsilon(t)$ towards the right) is applied. The choice of that value $\alpha = 1/256$ is an advantage and is a compromise between a value $\alpha$ which is as small as possible but greater than zero, to limit the loop gain produced by the digital integrator (24, 38) and thus avoid a divergence of the system and correspondingly enable the simplifying of the digital integrator circuit constituted by the adder 38 looped on the memory register 24. Of course, the value of $\alpha$ can be different; in a digital embodiment $1/\alpha$ will be equal to a power of 2 and the number of orders of shift towards the right of $|\epsilon(t)|$ will be given by the coefficient in power.

In the example of embodiment given, with a convergence time close to 100 ms, the residual echo level generated by $x(t)$ remains less than $-40$dB. At the time of operation of the echo canceller, when there is the signal $z(t)$ coming from the near end, an automatic increase in the convergence time is given; that increase maintains the auto-adaptive operation of the echo canceller and causes no great deterioration of its performances.

The present invention has been described with reference to be embodiment illustrated, given by way of an example. It is evident that, without going beyond the scope of the invention, details can be modified and/or certain means can be replaced by other technically equivalent means therein.

We claim:

1. Echo canceller comprising a transversal filter, to form a synthetic echo signal $\hat{y}(t)$ effecting a convolution of N samples $X(t)$ each coded on $n$ bits of a received signal $x(t)$, recorded in a first memory and of N filtration weighting samples C obtained by correlation of the residual echo signal $\epsilon(t)$ and of the samples $X(t)$ and recorded in a second memory, a digital subtractor forming the residual echo signal $\epsilon(t)$ coded on $n$ bits based on the true echo signal $y(t)$ and on the synthetic echo signal $\hat{y}(t)$, means for determining the absolute value of the residual echo signal, means for determining the sign of the variations of the weighting coefficients, and means including an adaptive control loop for adjusting the filtration weighting coefficients C from the absolute value of the said residual echo signal and from the correlation of the signs of N samples $X(t)$ of the received signal and of the residual echo signal determining the sign of each of the variations of the filtration weighting coefficients C, said filtration weighting coefficients C in said first memory being less than $2^n$, and being recorded in the said second memory each on $n + m$ bits, said adaptive control loop including a first adder having $(n + m)$ first inputs receiving the successive filtration weighting coefficients and having $(n + m)$ second inputs receiving the residual echo signal $\epsilon(t)$ multiplied by a coefficient $\alpha$ close to zero and accompanied by the sign of the correlation of the signs effected, $m$ being the minimum number of bits necessary for representing the reverse of the coefficient $\alpha$, said second adder sending out the filtration weighting coefficients to the said second memory to which it is looped.

2. Device according to claim 1, wherein said digital subtractor sending out the residual echo signal $\epsilon(t)$ on $n$ bits is connected to the said first adder with a shift towards the right of $m$ binary positions, effected on the $n$ bits of the signal $\epsilon(t)$, to multiply that signal $\epsilon(t)$ by a coefficient $\alpha$ which is then equal to $2^{-m}$.

3. Device according to claim 1 wherein said transverse digital filter comprises a second multiplier having $n$ first and $n$ second inputs receiving the $n$ bits having the heaviest weight of the weighting coefficients C and the $n$ bits of the samples $X(t)$ of the received signal $x(t)$ recorded in the said first memory and sending out their product on the $2n$ outputs and a digital accumulator having $2n$ first inputs connected to the second multiplier and $2n$ second inputs looped back on its $2n$ outputs on which is sent out the said synthetic echo signal $\hat{y}(t)$, with a view to forming the said residual echo signal $\epsilon(t)$ sent out exclusively on the $n$ bits having the heaviest weight.

4. Device according to claim 3 including a logic circuit having a first set of logic gates conditioned by a detector for the threshold of the level of the echo signal combining, at the time when an echo signal lower than that threshold appears and when there is a signal $x(t)$ and applying them to the inputs of the said first adder, the binary weights of $\epsilon(t)$ effecting a multiplying of the signal $\epsilon(t)$ by the coefficient $\alpha$ assuming a value close to the value $2^{-m}$ chosen for $\alpha$, and having a second set of logic gates combining, at the time of the exceeding of that threshold by the echo signal and when there is $x(t)$, all the binary weights of the signal $\epsilon(t)$ on the input having the lightest weight of the first adder, effecting a multiplication of the signal $\epsilon(t)$ by the coefficient assuming a new value, close to $2^{-(n+m)}$.

5. Device according to claim 1 wherein said first multiplier of signs is formed by a logic "exclusive OR" gate.

* * * * *